(12) United States Patent
Matsumoto et al.

(10) Patent No.: US 10,432,022 B2
(45) Date of Patent: Oct. 1, 2019

(54) WIRELESS POWER TRANSMISSION SYSTEM AND POWER TRANSMISSION APPARATUS

(71) Applicant: Panasonic Intellectual Property Management Co., Ltd., Osaka (JP)

(72) Inventors: Hiromu Matsumoto, Osaka (JP); Hiroshi Yamamoto, Osaka (JP); Hiroshi Kanno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 236 days.

(21) Appl. No.: 15/643,507

(22) Filed: Jul. 7, 2017

(65) Prior Publication Data

US 2017/0310162 A1    Oct. 26, 2017

Related U.S. Application Data

(63) Continuation of application No. PCT/JP2016/000518, filed on Feb. 2, 2016.

(30) Foreign Application Priority Data

Sep. 29, 2015  (JP) ................................. 2015-191406

(51) Int. Cl.
*H01F 38/14*    (2006.01)
*H02J 50/05*    (2016.01)
(Continued)

(52) U.S. Cl.
CPC .............. *H02J 50/05* (2016.02); *H02J 7/025* (2013.01); *H02M 3/335* (2013.01);
(Continued)

(58) Field of Classification Search
CPC .......... H02J 50/05; H02J 7/025; H02M 3/335; Y02B 70/1433; H04B 5/0037; H04B 5/0012

See application file for complete search history.

(56) References Cited

U.S. PATENT DOCUMENTS

| 9,859,051 B2 * | 1/2018 | Ren ......................... H01F 38/14 |
| 2008/0164876 A1 * | 7/2008 | Sakakura ............. G01R 33/385 |
| | | 324/318 |

(Continued)

FOREIGN PATENT DOCUMENTS

| JP | 2010-193692 | 9/2010 |
| JP | 2014-121184 | 6/2014 |

(Continued)

OTHER PUBLICATIONS

International Search Report of PCT application No. PCT/JP2016/000518 dated Apr. 26, 2016.
(Continued)

*Primary Examiner* — Alfonso Perez Borroto
*Assistant Examiner* — Esayas G Yeshaw
(74) *Attorney, Agent, or Firm* — Renner, Otto, Boisselle & Sklar, LLP

(57) ABSTRACT

In an embodiment, a wireless power transmission system includes at least one of the following combinations: i) a transmission-side series resonance circuit including the first coil and a first capacitor disposed between the first coil and a power transmission circuit, and ii) a transmission-side parallel resonance circuit including the second coil and a second capacitor disposed between the second coil and the two power transmission electrodes, and a combination of i) a reception-side parallel resonance circuit including a third coil and a third capacitor disposed between the third coil and two power reception electrodes, and ii) a reception-side series resonance circuit including a fourth coil and a fourth (Continued)

capacitor disposed between the fourth coil and a power reception circuit.

12 Claims, 9 Drawing Sheets

(51) Int. Cl.
    *H02M 3/335*     (2006.01)
    *H04B 5/00*     (2006.01)
    *H02J 7/02*     (2016.01)

(52) U.S. Cl.
    CPC ......... *H04B 5/0012* (2013.01); *H04B 5/0037* (2013.01); *Y02B 70/1433* (2013.01)

(56) References Cited

U.S. PATENT DOCUMENTS

| | | | |
|---|---|---|---|
| 2008/0303479 A1* | 12/2008 | Park | H02J 7/025 320/108 |
| 2011/0037322 A1 | 2/2011 | Kanno | |
| 2012/0032632 A1* | 2/2012 | Soar | H01F 38/14 320/108 |
| 2012/0038223 A1 | 2/2012 | Harakawa et al. | |
| 2012/0286583 A1 | 11/2012 | Ichikawa et al. | |
| 2012/0319646 A1* | 12/2012 | Kamata | H02J 7/025 320/108 |
| 2014/0035379 A1* | 2/2014 | Stevens | H02J 7/0013 307/104 |
| 2014/0197695 A1* | 7/2014 | Waffenschmidt | H02J 7/025 307/104 |
| 2014/0312702 A1* | 10/2014 | Uchida | H02J 17/00 307/80 |
| 2015/0224883 A1* | 8/2015 | Ichikawa | B60L 50/40 320/108 |
| 2015/0270720 A1 | 9/2015 | Takahashi et al. | |
| 2015/0326028 A1* | 11/2015 | Suzuki | H02J 7/025 307/104 |
| 2016/0118836 A1* | 4/2016 | Waldschmidt | H02J 7/025 320/108 |
| 2017/0133880 A1* | 5/2017 | Wakisaka | H02J 50/80 |
| 2018/0062430 A1* | 3/2018 | Matsumoto | H02J 7/00 |

FOREIGN PATENT DOCUMENTS

| | | |
|---|---|---|
| JP | 2015-106982 A | 6/2015 |
| WO | 2014/103438 | 7/2014 |
| WO | 2015/053246 A1 | 4/2015 |

OTHER PUBLICATIONS

The Extended European Search Report dated Jul. 31, 2018 for the related European Patent Application No. 16850530.3.

\* cited by examiner

WIRELESS POWER TRANSMISSION SYSTEM AND POWER TRANSMISSION APPARATUS

BACKGROUND

1. Technical Field

The present disclosure relates to a wireless power transmission system and a power transmission apparatus that wirelessly transmit electric power.

2. Description of the Related Art

In recent years, activities have been made to develop a wireless (contactless) electric power transmission technique for wirelessly (contactlessly) transmitting electric power to a mobile apparatus such as a portable telephone device, an electric vehicle, or the like. The wireless power transmission technique is classified into an electromagnetic induction type, an electric field coupling type, etc. Of these types, in the electric field coupling type, a pair of power transmission electrodes and a pair of power reception electrodes are disposed opposing each other, and AC power is supplied to the pair of power transmission electrode thereby contactlessly transmitting electric power to a reception-electrode side. The electric field coupling type may be preferably used to transmit electric power to a load (for example, a mobile robot or the like) from a pair of power transmission electrodes disposed, for example, on a floor surface. Japanese Unexamined Patent Application Publication No. 2010-193692 discloses an example of a wireless power transmission system using such an electric field coupling type.

SUMMARY

In the related technique described above, in a case where power transmission electrodes and power reception electrodes are located close to each other or in a case where a dielectric material with high relative permittivity is provided between the power transmission electrodes and the power reception electrodes, it is possible to achieve high-efficiency contactless power transmission. However, in a case where the distance between the power transmission electrodes and the power reception electrodes is large or in a case where a dielectric material with high relative permittivity is not provided between the power transmission electrodes and the power reception electrodes, it is impossible to achieve high-efficiency power transmission.

In one general aspect, the techniques disclosed here feature a wireless power transmission system including a power transmission apparatus and a power reception apparatus, the power transmission apparatus including a power transmission circuit that converts DC power of an external DC power supply to AC power, a first coil connected to the power transmission circuit, a second coil inductively coupled to the first coil, and two power transmission electrodes that are connected to the second coil and that transmit the AC power, the power reception apparatus including two power reception electrodes disposed opposing the two power transmission electrodes so as to be capacitively coupled with the two power transmission electrodes to contactlessly receive the transmitted AC power, a third coil connected to the two power reception electrodes, a fourth coil connected to the third coil, and a power reception circuit that is connected to the fourth coil and that converts the received AC power to DC power, the wireless power transmission system having at least one of the following combinations: a combination of i) a transmission-side series resonance circuit including the first coil and a first capacitor disposed between the first coil and the power transmission circuit, and ii) a transmission-side parallel resonance circuit including the second coil and a second capacitor disposed between the second coil and the two power transmission electrodes, and a combination of i) a reception-side parallel resonance circuit including the third coil and a third capacitor disposed between the third coil and the two power reception electrodes, and ii) a reception-side series resonance circuit including the fourth coil and a fourth capacitor disposed between the fourth coil and the power reception circuit.

These general or specific embodiments may be implemented as a system, a method, an integrated circuit, a computer program, or a storage medium, or as an arbitrary combination of a system, an apparatus, a method, an integrated circuit, a computer program, and a storage medium.

According to one aspect of the present disclosure, it is possible to transmit electric power with a higher efficiency than is conventionally achieved, even in the case where the distance between the power transmission electrodes and the power reception electrodes is long or even in a case where no dielectric material with high relative permittivity is provided.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

Before embodiments of the present disclosure are described, underlying knowledge forming basis of the present disclosure is described.

The inventors of the present disclosure have found that the known wireless power transmission system described in "Background Art" has problems described below.

Figure 13:
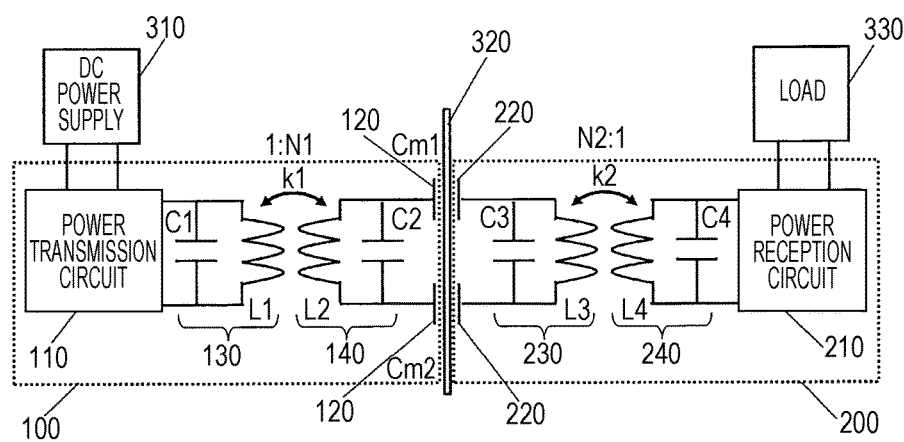
FIG. 13 is a diagram illustrating an example (a comparative example) of a circuit configuration of a wireless power transmission system similar to a power supply system disclosed in Japanese Unexamined Patent Application Publication No. 2010-193692.

FIG. 13 is a diagram illustrating an example (a comparative example) of a circuit configuration of a wireless power transmission system similar to the power supply system disclosed in Japanese Unexamined Patent Application Publication No. 2010-193692. This system includes a power transmission apparatus 100 that transmits electric power and a power reception apparatus 200 that receives the transmitted electric power. Electric power is contactlessly transmitted between two power transmission electrodes 120 possessed by the power transmission apparatus 100 and two power reception electrodes 220 possessed by the power reception apparatus 200.

The power transmission apparatus 100 includes a power transmission circuit 110 that converts DC power supplied from an external DC power supply 310 to AC power and outputs the resultant AC power, a first parallel resonance circuit 130 connected to the power transmission circuit 110, a second parallel resonance circuit 140 magnetically coupled to the first parallel resonance circuit 130, and two power transmission electrodes 120 connected to the second parallel resonance circuit 140. The first parallel resonance circuit 130 includes a coil L1 and a capacitor C1 that are connected to each other in parallel. The second parallel resonance circuit 140 includes a coil L2 and a capacitor C2 that are connected to each other in parallel. The coil L1 and the coil L2 from a transformer in which the coil L1 and the coil L2 are coupled to each other with a coupling coefficient k1. The turn ratio (1:N1) between the coil L1 and the coil L2 is set to a value so as to achieve a desired voltage transformation ratio.

The power reception apparatus 200 includes the pair of power reception electrodes 220 that receives AC power transmitted from the pair of power transmission electrodes 120, a third parallel resonance circuit 230 connected to the pair of power reception electrodes 220, a fourth parallel resonance circuit 240 magnetically coupled to the third parallel resonance circuit 230, and a power reception circuit 210 that converts AC power output from the fourth parallel resonance circuit 240 to DC power and supplies the resultant DC power to a load 330. The third parallel resonance circuit 230 is configured such that a coil L3 and a capacitor C3 are connected in parallel. The fourth parallel resonance circuit 240 is configured such that a coil L4 and a capacitor C4 are connected in parallel. The coil L3 and the coil L4 from a transformer in which the coil L3 and the coil L4 are coupled to each other with a coupling coefficient k2. The turn ratio (N2:1) between the coil L3 and the coil L4 is set to a value so as to achieve a desired voltage transformation ratio.

The first parallel resonance circuit 130, the second parallel resonance circuit 140, the third parallel resonance circuit 230, and the fourth parallel resonance circuit 240 are all equal in terms of the resonance frequency, and the power transmission circuit 110 outputs AC power with the frequency equal to this resonance frequency. This makes it possible for each parallel resonance circuit to be in a resonant state and be high in impedance when electric power is transmitted.

The power transmission electrode 120 and the power reception electrode 220 are disposed close to each other such that they oppose each other. A dielectric material 320 (for example, a floor surface) with a high relative permittivity is disposed between the power transmission electrode 120 and the power reception electrode 220. In the related technique configured in the above-described manner, electric power is transmitted in a state in which the capacitance Cm1 and the capacitance Cm2 between the two power transmission electrodes 120 and the two power reception electrodes 220 are set to be as high as possible so as to make it possible to stably transmit electric power even when a deviation occurs in a relative position between the power transmission electrodes 120 and the power reception electrodes 220. By setting the capacitance Cm1 and the capacitance Cm2 to be as large as possible, the power transmission electrode 120 and the power reception electrode 220 are made to have extremely low impedance compared with the impedance of the third parallel resonance circuit 230 and the fourth parallel resonance circuit 240 in the resonant state. Therefore, even in a case where a deviation in relative position occurs between the power transmission electrodes 120 and the power reception electrodes 220 and thus a change occurs in the capacitance Cm1 or Cm2, it is possible to reduce a change in voltage applied to the load 330.

In the configuration disclosed in Japanese Unexamined Patent Application Publication No. 2010-193692, as described above, it is necessary to set the capacitance Cm1 and the capacitance Cm2 to be large in order to reduce the impedance of the electrodes. To achieve this necessity, the distance between the electrodes is set to be as small as possible, and the high-permittivity dielectric material 320 is disposed between the electrodes.

However, in this wireless power transmission system configured in the above-described manner, there is a restriction on the relative position between the power transmission apparatus 100 and the power reception apparatus 200. To make it possible to use the wireless power transmission system in a wide variety of applications, it is desirable that a high transmission efficiency can be maintained even in a case where the dielectric material between the electrodes is replaced by an air gap or in a case where the distance between the electrodes is relatively large (for example, 10 mm to several ten mm).

The inventors of the present application have found that in the configuration shown in FIG. 13, when the dielectric material 320 is removed or the distance between the electrodes is increased, an increase occurs n impedance between the electrodes and it becomes difficult to achieve impedance matching. This problem is described further referring to FIG. 14A and FIG. 14B.

Figure 14A:
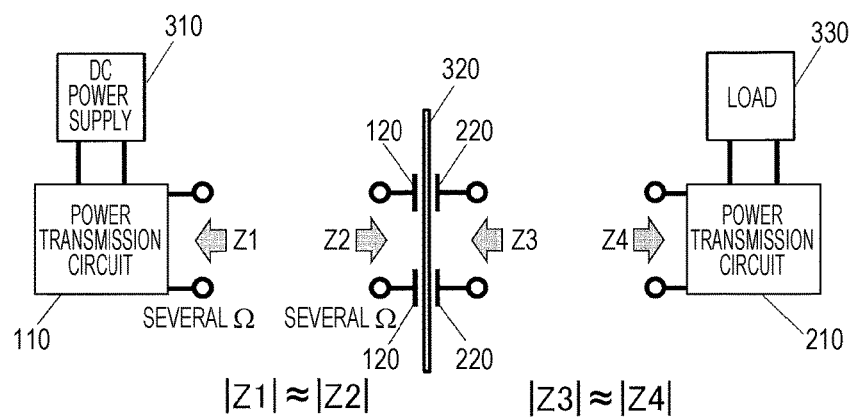
FIG. 14A is a diagram illustrating a relationship in terms of impedance between units in the configuration shown in FIG. 13.
Figure 14B:
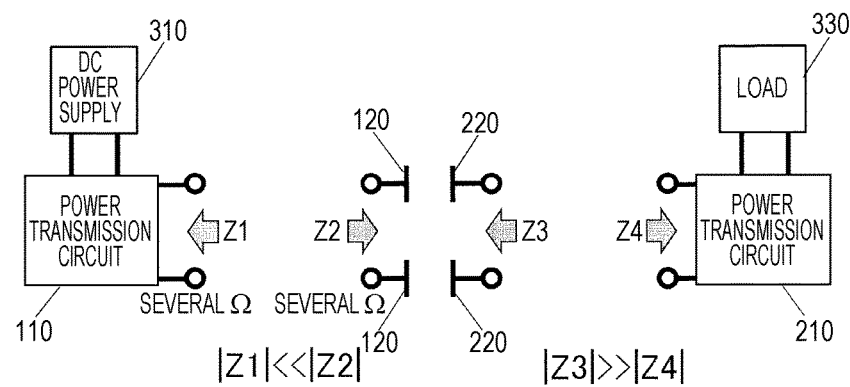
FIG. 14B is a diagram illustrating a relationship in terms of impedance between units for a case where a dielectric material is removed from the configuration shown in FIG. 13 and the distance between electrodes is increased.

FIG. 14A illustrates a relationship in terms of impedance between units in the configuration shown in FIG. 13. FIG. 14B illustrates a relationship in terms of impedance between units for a case where the dielectric material 320 is removed from the configuration shown in FIG. 13 and the distance between the electrodes is increased. As shown in FIG. 14A, in the case where the dielectric material 320 exists between the electrodes and the distance between the electrodes is small, the impedance between the electrode has a small value, for example, several Ω. In this case, it is relatively easy to achieve impedance matching between the impedance Z1 of the power transmission circuit 110 and the impedance Z2 of the power transmission electrode 120, and it is also relatively easy to achieve impedance matching between the impedance Z3 of the power reception electrode 220 and the impedance Z4 of the load side.

However, as shown in FIG. 14B, in the case where the dielectric material 320 is removed and the distance between the electrodes is increased to, for example, about 10 mm, the capacitance becomes very small. When the angular frequency of the AC power transmitted is denoted by co, a relation of $Z=1/(\omega C)$ holds between the impedance Z and the capacitance C. Therefore, when the capacitance becomes very small, the impedance between the electrodes becomes very large (for example, the impedance may be several kΩ). In this case, the impedance Z2 and the impedance Z3 on the electrode side become too large compared with the impedance Z1 of the power transmission circuit 110 and the impedance Z4 (for example, several Ω) of the power reception circuit, and thus it becomes difficult to achieve impedance matching. As a result, it becomes impossible to achieve a high electric power transmission efficiency.

The problem described above arises from the configuration shown in FIG. 13 in which each of the power transmission apparatus 100 and the power reception apparatus 200 has a combination of two parallel resonance circuits. The inventors of the present application have found that it is possible to solve the problem described above by configuring at least one of the power transmission apparatus 100 and the power reception apparatus 200 such that the two resonance circuits thereof are formed so as to have a combination of a series resonance circuit and a parallel resonance circuit. This configuration is described below with reference to FIG. 15A and FIG. 15B.

Figure 15A:
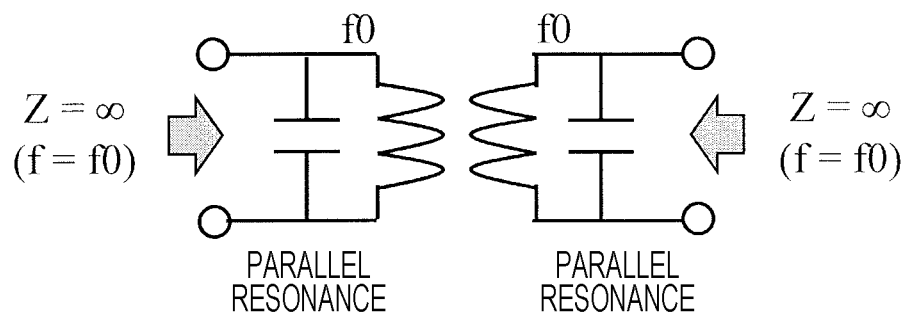
FIG. 15A is a diagram illustrating a resonator configuration in a power transmission apparatus in a known configuration.
Figure 15B:
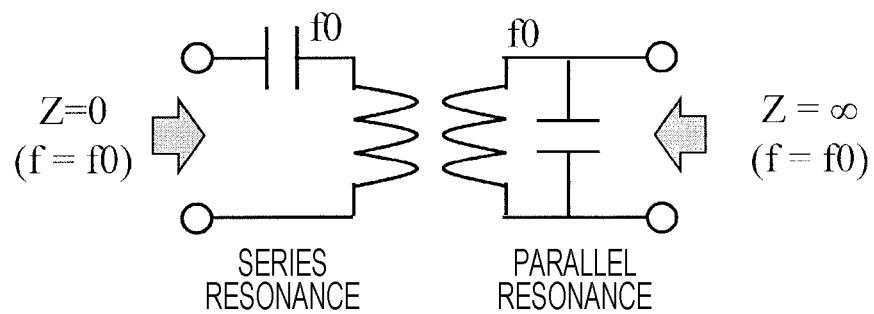
FIG. 15B is a diagram illustrating a configuration obtained by replacing a resonance circuit on a power-supply side (left side in FIG. 15A) in the configuration shown in FIG. 15A with a series resonance circuit.

FIG. 15A illustrates a resonator configuration in the power transmission apparatus 100 according to the related technique. FIG. 15B illustrates a configuration obtained by replacing the resonance circuit on the power-supply side (left side in FIG. 15A) in the configuration shown in FIG. 15A by a series resonance circuit. In the configuration according to the related technique shown in FIG. 15A, the resonators located on both the power-supply side and the electrode side (the right-hand side in FIG. 15A) are configured in the parallel resonance circuit, and thus both resonators have infinite impedance in the resonant state (in which the frequency f becomes equal to the resonance frequency f0). Therefore, it is difficult to achieve impedance matching between the low impedance on the power-supply side and the high impedance on the electrode side.

In contrast, in the configuration shown in FIG. 15B, the resonance circuit on the power-supply side is formed in the series resonance circuit, and thus it is possible to achieve impedance matching between the low impedance on the power-supply side and the high impedance on the electrode side. In the series resonance circuit, the impedance becomes zero (0) in the resonant state, and thus the series resonance circuit is suitable for achieving matching with low impedance. On the other hand, in the parallel resonance circuit, the impedance becomes infinite in the resonant state, and thus the parallel resonance circuit is suitable for achieving matching with high impedance. Thus, it is possible to easily achieve impedance matching by disposing a series resonance circuit on the power-supply side with low impedance and a parallel resonance circuit on the electrode side with high impedance as in the configuration shown in FIG. 15B.

The technique described above can be applied not only to the power transmission apparatus 100 but also to the power reception apparatus 200. That is, it is possible to preferably achieve impedance matching in the power reception apparatus 200 by disposing a parallel resonance circuit on the electrode side and a series resonance circuit on the load side.

Based on the knowledge described above, the present inventors have got ideas of various aspects of the present disclosure as described below.

In an aspect, the present disclosure provides a wireless power transmission system including a power transmission apparatus and a power reception apparatus, the power transmission apparatus including: a power transmission circuit that converts DC power of an external DC power supply to AC power, a first coil connected to the power transmission circuit, a second coil inductively coupled to the first coil, and two power transmission electrodes that are connected to the second coil and that transmit the AC power, the power reception apparatus including two power reception electrodes disposed opposing the two power transmission electrodes so as to be capacitively coupled with the two power transmission electrodes to contactlessly receive the transmitted AC power, a third coil connected to the two power reception electrodes, a fourth coil connected to the third coil, and a power reception circuit that is connected to the fourth coil and that converts the received AC power to DC power, the wireless power transmission system having at least one of the following combinations: a combination of i) a transmission-side series resonance circuit including the first coil and a first capacitor disposed between the first coil and the power transmission circuit, and ii) a transmission-side parallel resonance circuit including the second coil and a second capacitor disposed between the second coil and the two power transmission electrodes, and a combination of i) a reception-side parallel resonance circuit including the third coil and a third capacitor disposed between the third coil and the two power reception electrodes, and ii) a reception-side series resonance circuit including the fourth coil and a fourth capacitor disposed between the fourth coil and the power reception circuit.

In this aspect described above, the wireless power transmission system has at least one of the following combinations: the combination of i) a transmission-side series resonance circuit including the first coil and a first capacitor disposed between the first coil and the power transmission circuit, ii) a transmission-side parallel resonance circuit including the second coil and a second capacitor disposed between the second coil and the two power transmission electrodes, and the combination of i) a reception-side parallel resonance circuit including the third coil and a third capacitor disposed between the third coil and the two power reception electrodes, and ii) a reception-side series resonance circuit including the fourth coil and a fourth capacitor disposed between the fourth coil and the power reception circuit.

Thus, a parallel resonance circuit is disposed on a side close to electrodes at least in one of the power transmission apparatus and the power reception apparatus, and a series resonance circuit is disposed on a side far from the electrodes. This makes it possible to preferably achieve impedance matching even in a case where the impedance between electrodes is high.

Specific embodiments of the present disclosure are described below. Note that a description in unnecessary detail may be omitted. For example, a detailed description of an already well known fact or item, or a duplicated description of substantially the same element may be omitted in order to prevent the following description from being unnecessarily redundant thereby making it possible for those skilled in the art to easily understand the description. It should be noted that the present inventors provide accompanying drawing and the following description in order to allow those skilled in the art to well understand the present disclosure but not to limit the subject matter of the present disclosure to the scope described in claims. In the following description, the same or similar constituent elements are denoted by the same reference symbols.

First Embodiment

First, a first embodiment of the present disclosure is described.

Figure 1:
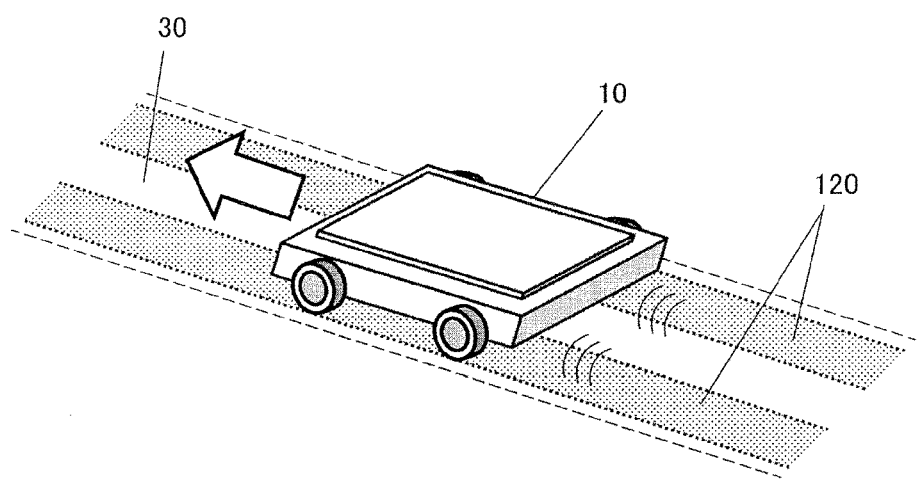
FIG. 1 is a diagram schematically illustrating a wireless power transmission system according to a first embodiment.

FIG. 1 is a diagram schematically illustrating a wireless power transmission system according to the present embodiment. In this example, electric power is wirelessly transmitted from a power transmission apparatus having a pair of power transmission electrodes 120 embedded below a floor surface 30 to a transport robot 10 having a pair of power reception electrodes. In this system, the wireless power transmission is performed using the electric field coupling technique described above. The pair of power transmission electrodes 120 extends in parallel along the floor surface 30 over which the transport robot 10 is capable of conveying an object while receiving electric power.

Figure 2:
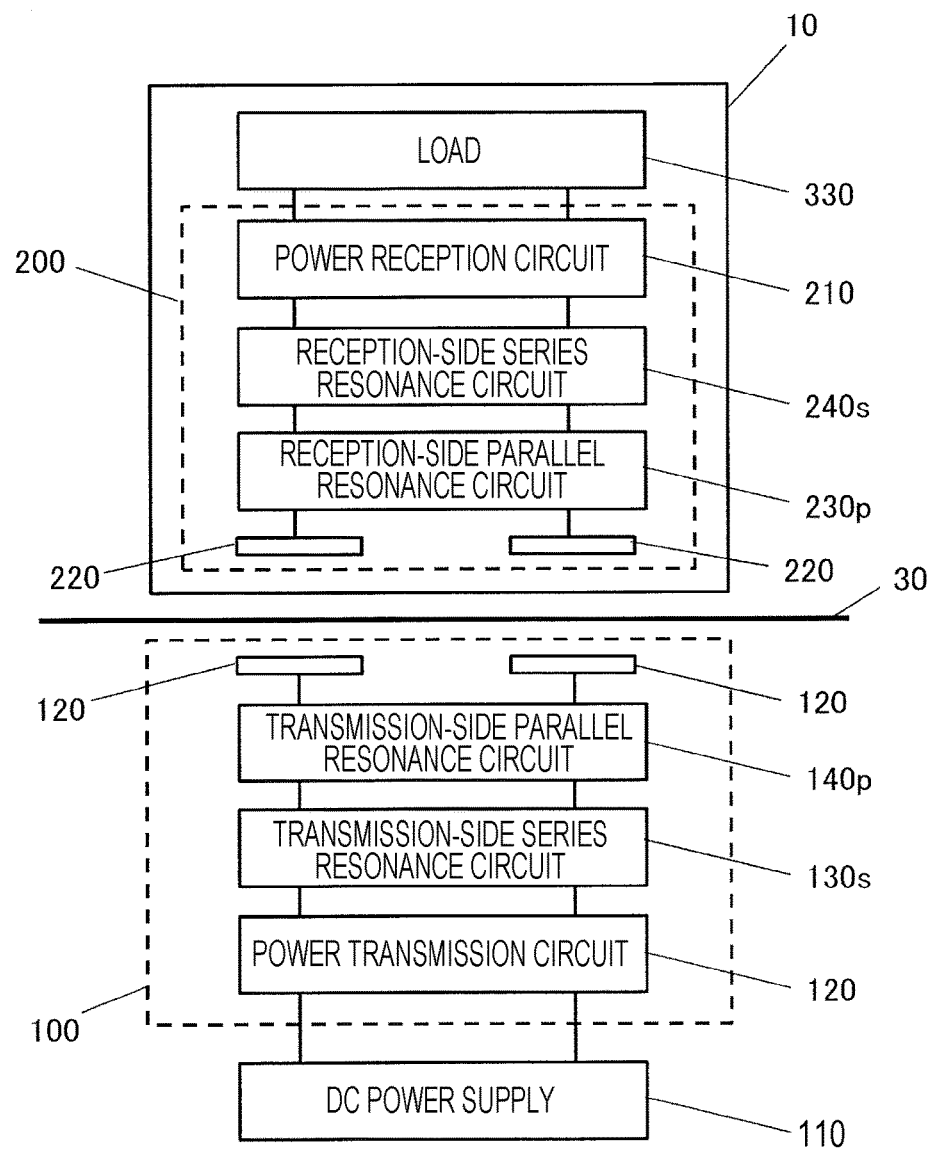
FIG. 2 is a block diagram illustrating an outline of a configuration of a wireless power transmission system according to the first embodiment.

FIG. 2 is a block diagram illustrating an outline of a configuration of the wireless power transmission system according to the present embodiment. This system includes a power transmission apparatus 100, and a transport robot 10. The power transmission apparatus 100 includes a power transmission circuit 110 that converts DC power supplied from an external DC power supply 310 to AC power, a transmission-side series resonance circuit 130s connected to the power transmission circuit 110, a transmission-side parallel resonance circuit 140p inductive coupled with the transmission-side series resonance circuit 130s, and two power transmission electrodes 120 that are connected to the transmission-side parallel resonance circuit 140p and transmit AC power. The transport robot 10 includes a power reception apparatus 200 and a load 330. The power reception apparatus 200 includes two power reception electrodes 220 that are capacitively coupled with the two power transmission electrodes 120 and contactlessly receive the transmitted AC power, a reception-side parallel resonance circuit 230p connected to the two power reception electrodes 220, a reception-side series resonance circuit 240s inductively coupled with the reception-side parallel resonance circuit 230p, and a power reception circuit 210 that are connected to the reception-side series resonance circuit 240s and that converts the received AC power to DC power and outputs the resultant DC power. The load 330 includes, for example, a secondary battery and a motor, and is charged or driven by the DC power output from the power reception circuit 210.

Figure 3:
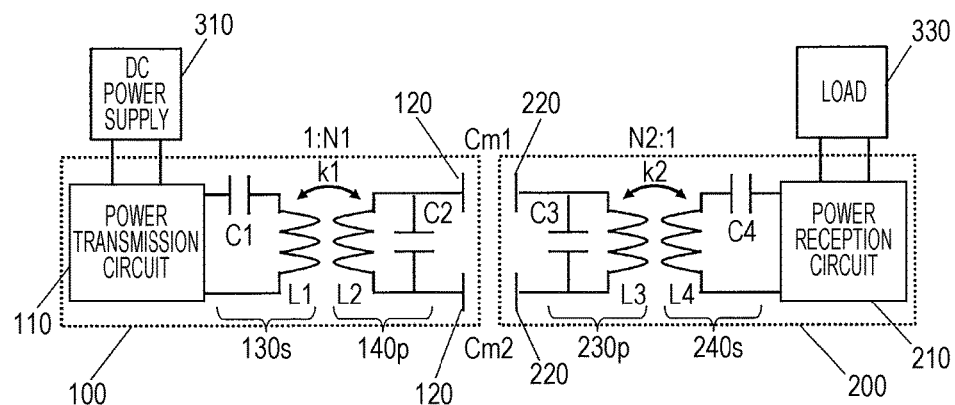
FIG. 3 is a circuit diagram illustrating an outline of a configuration of a wireless power transmission system according to the first embodiment.

FIG. 3 is a circuit diagram illustrating an outline of a configuration of the wireless power transmission system according to the present embodiment. As shown in FIG. 3, the transmission-side series resonance circuit 130s in the power transmission apparatus 100 is configured such that a first coil L1 and a first capacitor C1 are connected in series. The transmission-side parallel resonance circuit 140p in the power transmission apparatus 100 is configured such that a second coil L2 and a second capacitor C2 are connected in parallel. The first coil L1 and the second coil L2 from a transformer in which the coil L1 and the coil L2 are coupled to each other with a coupling coefficient k1. The turn ratio (1:N1) between the first coil L1 and the second coil L2 is set to a value so as to achieve a desired voltage transformation ratio.

The reception-side parallel resonance circuit 230p in the power reception apparatus 200 is configured such that a third coil L3 and a third capacitor C3 are connected in parallel. The reception-side series resonance circuit 240s in the power reception apparatus 200 is configured such that a fourth coil L4 and a fourth capacitor C4 are connected in series. The third coil and the fourth coil from a transformer in which the coil L3 and the coil L4 are coupled to each other with a coupling coefficient k2. The turn ratio (N2:1) between the third coil L3 and the fourth coil L4 is set to a value so as to achieve a desired voltage transformation ratio (a step-up ratio or a step-down ratio).

As described above, the wireless power transmission system according to the present embodiment includes both of the following combinations: the combination of transmission-side series resonance circuit 130s and the transmission-side parallel resonance circuit 140p, and the combination of the reception-side parallel resonance circuit 230p and the reception-side series resonance circuit 240s.

Each constituent element is described in further detail below. Note that in the present description, reference symbols L1, L2, L3, and L4 used to denote inductors are also used to denote inductance values of the corresponding inductors. Similarly, reference symbols C1, C2, C3, and C4 used to denote capacitors are also used to denote capacitance values of the corresponding capacitors.

Figure 4:
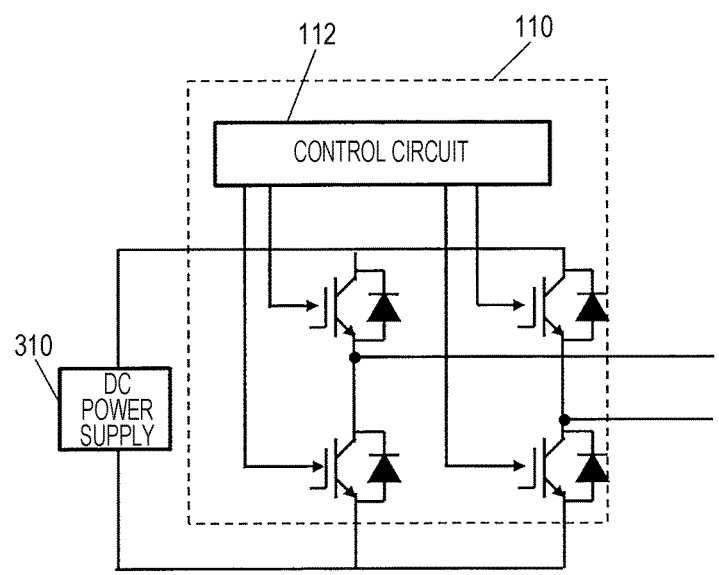
FIG. 4 is a diagram schematically illustrating an example of a configuration of a power transmission circuit.

FIG. 4 is a diagram schematically illustrating an example of a configuration of the power transmission circuit 110. In this example, the power transmission circuit 110 includes a full-bridge inverter circuit including four switching elements (for example, transistors such as IGBTs, MOSFETs, or the like) and a control circuit 112. The control circuit 112 includes a gate driver that outputs a control signal to control an on-state (conduction state) and an off-state (non-conduction state) of each switching element, and a processor such as a microcontroller or the like for controlling the gate driver to output the control signal. Alternatively, instead of the full-bridge inverter circuit shown in the figure, a half-bridge inverter circuit or another type of oscillation circuit such as an E-class oscillation circuit may be used. The power transmission circuit 110 may include a modulation-demodulation circuit for communication, and various sensors for measuring a voltage, a current, or the like.

Figure 5:
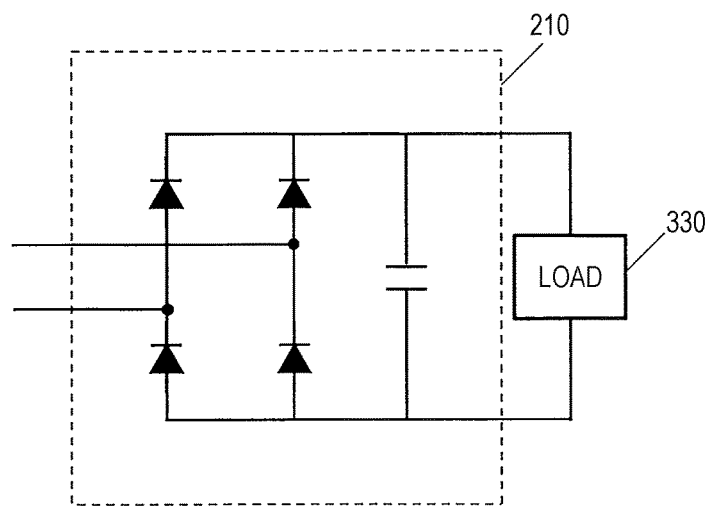
FIG. 5 is a diagram schematically illustrating an example of a configuration of a power reception circuit.

FIG. 5 is a diagram schematically illustrating an example of a configuration of the power reception circuit 210. In this example, the power reception circuit 210 is a full-wave rectifying circuit including a diode bride and a smoothing capacitor. However, the power reception circuit 210 may be configured in the form of another type of rectifier. The power reception circuit 210 may include, in addition to the rectification circuit, other various circuits such as a constant voltage/constant current control circuit, a modulation-demodulation circuit for communication, or the like. The power reception circuit 210 converts the received AC energy to DC energy usable by the load 330. The power reception circuit 210 may further include various sensors for measuring a voltage, a current, or the like output from the reception-side series resonance circuit 240s.

In the transmission-side series resonance circuit 130s the transmission-side parallel resonance circuit 140p, the reception-side parallel resonance circuit 230p, and the reception-side series resonance circuit 240s, each coil used therein may be, for example, a planar coil or a multilayer coil formed on a circuit board, or a winding coil using a copper wire, a litz wire, or a twisted wire. In the transmission-side series resonance circuit 130s, the transmission-side parallel resonance circuit 140p, the reception-side parallel resonance circuit 230p, and the reception-side series resonance circuit 240s, each capacitor may be a capacitor of any type, for example, a capacitor having a chip shape or a lead shape. Capacitance formed between two wirings via air may be used as each capacitor. Instead of using capacitors, a self-resonance characteristic possessed by each coil may be used.

The DC power supply 310 may be an arbitrary power supply such as a commercial power supply, a primary battery, a secondary battery, a solar battery, a fuel battery, a USB (Universal Serial Bus) power supply, a high-capacitance capacitor (for example, an electric double-layer capacitor), a voltage transformer connected to a commercial power supply, or the like.

In the transmission-side series resonance circuit 130s, the transmission-side parallel resonance circuit 140p, the reception-side parallel resonance circuit 230p, and the reception-side series resonance circuit 240s, the resonance frequency f0 thereof is set to be equal to the transmission frequency fin the electric power transmission state. Note that the resonance frequency f0 of each of the transmission-side series resonance circuit 130s, the transmission-side parallel resonance circuit 140p, the reception-side parallel resonance circuit 230p, and the reception-side series resonance circuit 240s does not need to be exactly equal to the transmission frequency f0. Each resonance frequency f0 may be set, for example, in a range of 50% to 150% of the transmission frequency f. The frequency fin the electric power transmission may be set, for example, in a range from 50 Hz to 300 GHz and more preferably from 20 kHz to 10 GHz, still more preferably from 20 kHz to 20 MHz, and still more preferably from 20 kHz to 1 MHz.

In the present embodiment, there is an air gap between the power transmission electrode 120 and the power reception electrode 220, and the distance between them is set to be relatively large (for example, about 10 mm). Therefore, the capacitance Cm1 and the capacitance Cm2 between the electrodes are very small, and the impedance of the power transmission electrode 120 and the impedance of the power reception electrode 220 is very high (for example, about several kΩ). In contrast, the impedances of the power transmission circuit 110 and the power reception circuit 210 are as small as, for example, several Ω. Therefore, in the present embodiment, the transmission-side parallel resonance circuit 140p and the reception-side parallel resonance circuit 230p are respectively disposed on sides close to the power transmission electrode 120 and the power reception electrode 220, and the transmission-side series resonance circuit 130s and the reception-side series resonance circuit 240s are respectively disposed on sides close to the power transmission circuit 110 and the power reception circuit 210.

This configuration makes it possible to easily achieve the impedance matching. As a result, it becomes possible to transmit electric power with a higher efficiency than is conventionally achieved as described later.

Second Embodiment

Next, a second embodiment of the present disclosure is described.

Figure 6:
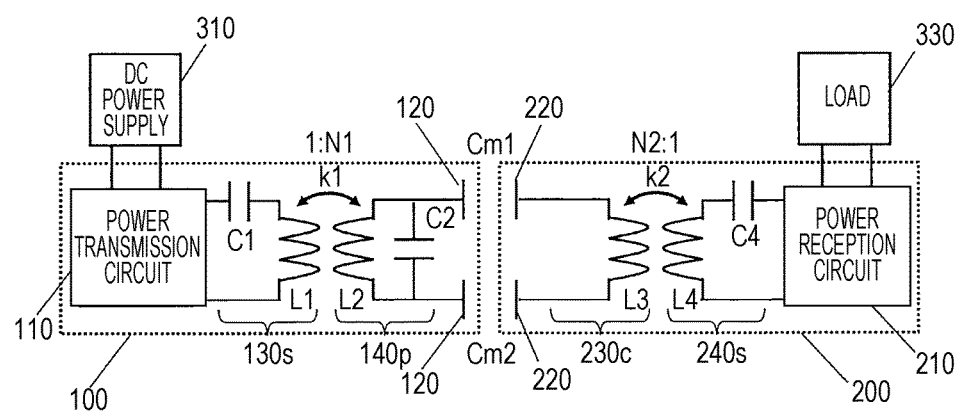
FIG. 6 is a circuit diagram illustrating an outline of a configuration of a wireless power transmission system according to a second embodiment.

FIG. 6 is a circuit diagram illustrating an outline of a configuration of the wireless power transmission system according to the present embodiment. The present embodiment is different from the first embodiment in that the power reception apparatus 200 includes a circuit 230c including a third coil L3 instead of the reception-side parallel resonance circuit 230p in the first embodiment. In this configuration, the inductance value L4 of the fourth coil L4 is smaller than the inductance value L3 of the third coil L3. Except for the above, the present embodiment is similar to the first embodiment.

That is, in the wireless power transmission system according to the present embodiment, the power transmission apparatus 100 has a combination of i) a transmission-side series resonance circuit 130s including a first coil and a first capacitor disposed between the first coil and a power transmission circuit 110, and ii) a transmission-side parallel resonance circuit 140p including a second coil and a second capacitor disposed between the second coil and two power transmission electrodes 120. On the other hand, the power reception apparatus 200 has a combination of i) the third coil with the inductance value L3 and ii) a reception-side series resonance circuit 240s including a fourth coil with an inductance value L4 lower than the inductance value L3 and a fourth capacitor disposed between the fourth coil and the power reception circuit 210.

In the present embodiment, the power transmission apparatus 100 has a combination of a series resonance circuit and a parallel resonance circuit although the power reception apparatus 200 does not have a combination of a series resonance circuit and a parallel resonance circuit. This configuration makes it possible to easily achieve impedance matching in the power transmission apparatus 100. Thus, also in the configuration according to the present embodiment, it is possible to achieve a higher transmission efficiency than is conventionally achieved as described later.

Third Embodiment

Next, a third embodiment of the present disclosure is described.

Figure 7:
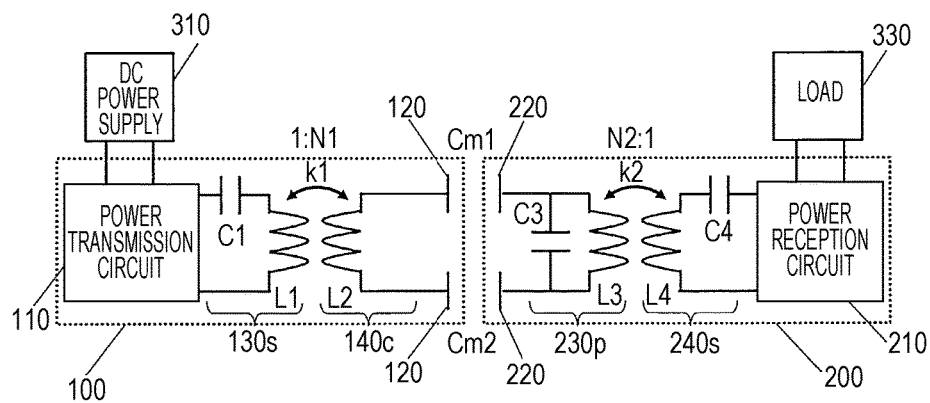
FIG. 7 is a circuit diagram illustrating an outline of a configuration of a wireless power transmission system according to a third embodiment.

FIG. 7 is a circuit diagram illustrating an outline of a configuration of the wireless power transmission system according to the present embodiment. The present embodiment is different from the first embodiment in that the power transmission apparatus 100 includes a circuit 140c including a second coil L2 instead of the transmission-side parallel resonance circuit 140p in the first embodiment. In this embodiment, the inductance value L2 of the second coil L2 is greater than the inductance value L1 of the first coil L1. Except for the above, the present embodiment is similar to the first embodiment.

That is, the power transmission apparatus 100 according to the present embodiment has a combination of i) a transmission-side series resonance circuit 130s including the first coil with the inductance value L1 and a first capacitor disposed between the first coil and a power transmission circuit 110, and ii) the second coil with the inductance value L2 higher than the inductance value L1. On the other hand, the power reception apparatus 200 has a combination of i) a reception-side parallel resonance circuit 230p including a third coil and a third capacitor disposed between the third coil and two power reception electrodes 220, and ii) a reception-side series resonance circuit 240s including the fourth coil and a fourth capacitor disposed between the fourth coil and a power reception circuit 210.

In the present embodiment, the power reception apparatus 200 has a combination of a series resonance circuit and a parallel resonance circuit although the power transmission apparatus 100 does not have a combination of a series resonance circuit and a parallel resonance circuit. This configuration makes it possible to easily achieve impedance matching in the power reception apparatus 200. Thus, also in the configuration according to the present embodiment, it is possible to achieve a higher transmission efficiency than is conventionally achieved as described later.

Fourth Embodiment

Next, a fourth embodiment of the present disclosure is described.

Figure 8:
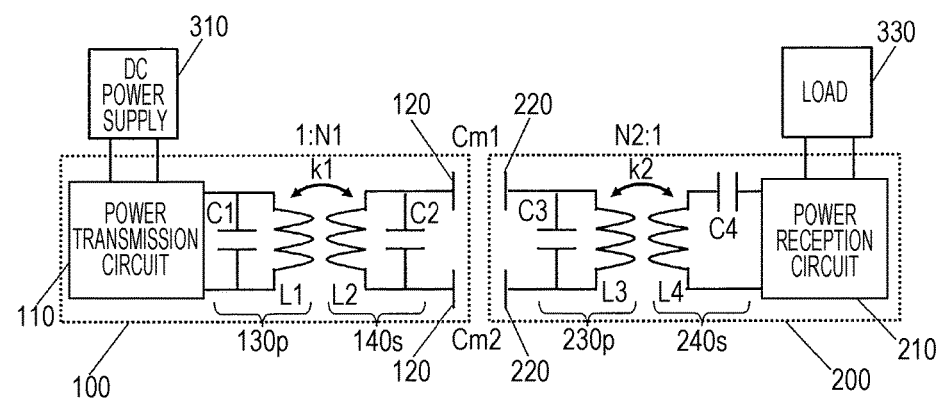
FIG. 8 is a circuit diagram illustrating an outline of a configuration of a wireless power transmission system according to a fourth embodiment.

FIG. 8 is a circuit diagram illustrating an outline of a configuration of the wireless power transmission system according to the present embodiment. The present embodiment is different from the first embodiment in that the power transmission apparatus 100 includes a parallel resonance circuit 130p instead of the transmission-side series resonance circuit 130s in the first embodiment. Except for the above, the present embodiment is similar to the first embodiment.

In the present embodiment, the power reception apparatus 200 has a combination of a series resonance circuit and a parallel resonance circuit although the power transmission apparatus 100 does not have a combination of a series resonance circuit and a parallel resonance circuit. This configuration makes it possible to easily achieve impedance matching in the power reception apparatus 200. Thus, also in the configuration according to the present embodiment, it is possible to achieve a higher transmission efficiency than is conventionally achieved as described later.

Fifth Embodiment

Next, a fifth embodiment of the present disclosure is described.

Figure 9:
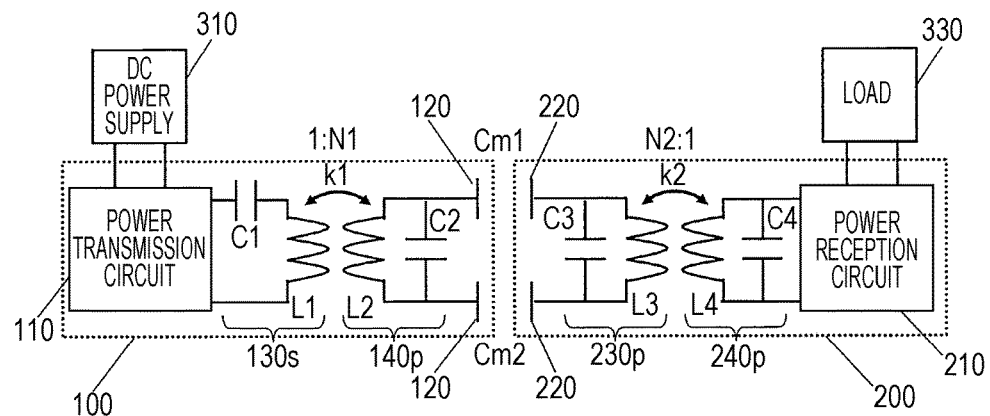
FIG. 9 is a circuit diagram illustrating an outline of a configuration of a wireless power transmission system according to a fifth embodiment.

FIG. 9 is a circuit diagram illustrating an outline of a configuration of the wireless power transmission system according to the present embodiment. The present embodiment is different from the first embodiment in that the power reception apparatus 200 includes a reception-side parallel resonance circuit 230p instead of the reception-side series resonance circuit 240s in the first embodiment. Except for the above, the present embodiment is similar to the first embodiment.

In the present embodiment, the power transmission apparatus 100 has a combination of a series resonance circuit and a parallel resonance circuit although the power reception apparatus 200 does not have a combination of a series resonance circuit and a parallel resonance circuit. This configuration makes it possible to easily achieve impedance matching in the power transmission apparatus 100. Thus, also in the configuration according to the present embodiment, it is possible to achieve a higher transmission efficiency than is conventionally achieved as described later.

EXAMPLES

Next, examples of the present disclosure are described.

The inventors of the present disclosure performed circuit simulations for wireless power transmission systems configured according to the first to fifth embodiments, and made comparisons with the configuration of the comparative example shown in FIG. 13 thereby verifying the advantageous effects of the embodiments of the present disclosure.

Figure 10:
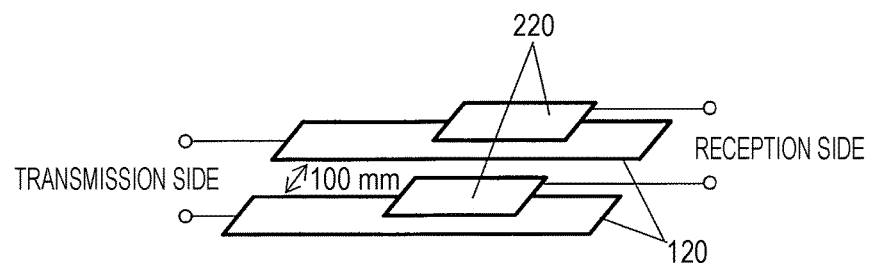
FIG. 10 is a diagram schematically illustrating a positional relationship between a pair of power transmission electrodes and a pair of power reception electrodes in an embodiment and a comparative example.

FIG. 10 is a diagram schematically illustrating a positional relationship between a pair of power transmission electrodes 120 and a pair of power reception electrodes 220 in an example and the comparative example. The two power transmission electrodes 120 are disposed in parallel via a gap of 100 mm, and the two power reception electrodes 220 are disposed opposing the two power transmission electrodes 120. The size of each power transmission electrode 120 was set to 100 mm×1000 mm$^2$, and the size of each power reception electrode 220 was set to 100 mm×400 mm$^2$. The distance between the power transmission electrode 120 and the power reception electrode 220 was set to 10 mm.

Figure 11:
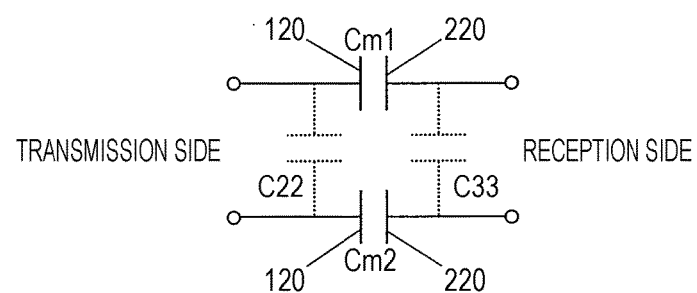
FIG. 11 is a diagram illustrating an equivalent circuit of power transmission electrodes and power reception electrodes.

FIG. 11 is a diagram illustrating an equivalent circuit of the power transmission electrodes 120 and the power reception electrodes 220. Let Cm1 and Cm2 denote the capacitances of two capacitors formed by the two power transmission electrodes 120 and the two power reception electrodes 220. Let C22 denote the capacitance between the two power transmission electrodes 120, and let C33 denote the capacitance between the two power reception electrodes 220. In this example and the comparative example, the capacitances were set such that Cm1=Cm2=93.2 pF, C22=44.5 pF, and C33=9.89 pF. In a case where a parallel resonance circuit is formed using C22 or C33, C2 or C3 may be omitted. Other parameters were set such that the inductance value L2 of the second coil and the inductance value L3 of the third coil were both set to 100 µH. The Q-value of a matching transformer formed by a combination of a series resonance circuit and a parallel resonance circuit was to 300. Herein, the ratio, L2/L1, of the inductance value L2 of the second coil to the inductance value L1 of the first coil is denoted by an inductance ratio N1. Similarly, the ratio, L3/L4, of the inductance value L3 of the third coil to the inductance value L4 of the fourth coil is denoted by an inductance ratio N2. Note that the inductance ratio equal to a turn ratio. The transmission frequency f was set to 480 kHz.

As for each coil, a spiral coil with a diameter of 80 mm was used which was formed in two layers using a litz wire including 375 element wires each having a diameter of 40 µm. A magnetic shield was disposed at each location 20 mm above and 20 mm below each coil. The inductance L2 of the second coil and the inductance L3 of the third coil on the high-impedance side were fixed to 100 µH, and the inductance L1 of the first coil and the inductance L4 of the fourth coil on the low-impedance side were adjusted so as to achieve as good impedance matching as possible.

Table 1 shows the inductance ratios (turn ratios) N1 and N2, the coupling coefficients k1 and k2, and electric power transmission efficiencies for the configurations according to the first to fifth embodiments and the comparative example. Table 2 shows capacitance values C1 to C4 for the respective configurations.

TABLE 1

| Configuration | N1 | N2 | k1 | k2 | Efficiency (%) |
|---|---|---|---|---|---|
| First Embodiment | 3.33 | 3.33 | 0.8 | 0.8 | 84.0 |
| Second Embodiment | 3.33 | 2.0 | 0.8 | 0.8 | 81.7 |
| Third Embodiment | 2.0 | 3.33 | 0.8 | 0.8 | 81.0 |
| Fourth Embodiment | 20.0 | 3.33 | 0.384 | 0.8 | 79.1 |
| Fifth Embodiment | 3.33 | 20.0 | 0.8 | 0.384 | 78.8 |
| Comparative Example | 20.0 | 20.0 | 0.327 | 0.327 | 72.5 |

TABLE 2

|  | C1 | C2 | C3 | C4 |
|---|---|---|---|---|
| First Embodiment | 2880 | 237 | 271 | 2880 |
| Second Embodiment | 2683 | 309 | — | 2126 |
| Third Embodiment | 2079 | — | 323 | 2741 |
| Fourth Embodiment | 7001 | 1178 | 425 | 2450 |
| Fifth Embodiment | 2450 | 390 | 1213 | 7005 |
| Comparative Example | 7108 | 1127 | 1162 | 7105 |

Unit: pF

Each parameter shown in Tables 1 and 2 was set in each configuration so as to minimize the reduction in efficiency caused by impedance mismatching. As shown in Table 1, in the configurations having at least one combination of a series resonance circuit and a parallel resonance circuit according to the first to fifth embodiments, it has been confirmed that a higher efficiency is achieved than is achieved in the configuration of the comparative example. Note that in the configuration of the comparative example, to minimize the impedance mismatching, the turn ratios N1 and N2 were set to as very large a value as 20. Such a large turn ratio is not usually used because a reduction in Q-value occurs. In a case where the turn ratio is set to a usually-used value in the configuration of the comparative example, impedance matching is not achieved, which results in a further reduction in transmission efficiency from the values shown in Table 1.

The effects of the embodiments of the present disclosure are greater as the impedance between the two power transmission electrodes 120 and the two power reception electrodes 220 increases. When the capacitance between the electrodes is denoted by C and the angular frequency of the transmitted electric power is denoted by $\omega$, the impedance between the electrodes is represented as $1/(\omega C)$, where the capacitance between the electrodes is one of the capacitance Cm1 and the capacitance Cm2 or the average value thereof. In a case where the impedance between the electrodes is higher, for example, than the impedance $\omega L2$ of the second coil, it is possible to achieve further enhanced effects in the embodiments of the present disclosure. Therefore, it is preferable to satisfy $\omega L2 < 1/(\omega C)$. More preferably, each constituent element is designed such that $10\, \omega L2 < 1/(\omega C)$ is satisfied.

Next, a description is given as to a relationship between the inductance ratio N and the Q-value in a matching transformer configured by a combination of a series resonance circuit and a parallel resonance circuit. Herein, the inductance ratio N is the ratio N1 (=L2/L1) of the inductance value L2 to the inductance value L1 or the ratio N2 (=L3/L4) of the inductance value L3 to the inductance value L4. The Q-value is an index indicating the degree to which the loss is low. The loss decreases as the Q-value increases. Therefore, it is desirable to set the Q-value of the matching transformer to be as high as possible.

Figure 12:
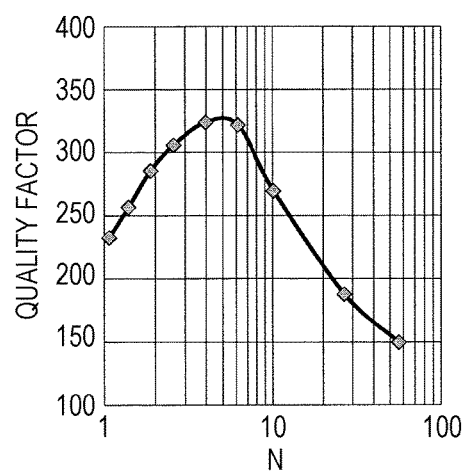
FIG. 12 is a graph representing a relationship between an inductance ratio N and a Q-value of a matching transformer.

FIG. 12 is a graph representing a relationship between the inductance ratio N and the Q-value of the matching transformer. Herein, when the Q-value of the coil (the second coil or the third coil) on the high-impedance side is denoted by QLhi, and the Q-value of the coil (the first coil or the fourth coil) on the low-impedance side is denoted by QLlo, the Q-value of the matching transformer is represented as $\sqrt{(QLhi*QLlo)}$. Herein, a condition similar to that used in the verification described above was used, that is, the inductance Lhi of the coil on the high-impedance side was fixed to 100 μH, and the number of turns of the coil on the low-impedance side was changed within a range from 3 to 50 thereby changing the impedance ratio N.

As can be seen from FIG. 12, when $1<N<15$ was satisfied, the Q-value was as high as 70% or more of the peak value. Furthermore, when $3<N<8$ was satisfied, the Q-value was as very high as 90% or more of the peak value. Therefore, the inductance ratio N, that is, the ratio of the inductance value L2 to the inductance value L1 or the ratio of the inductance value L3 to the inductance value L4 is designed such that $1<N<15$ is preferably satisfied, and more preferably $3<N<8$ is satisfied.

As described above, the present disclosure includes wireless power transmission systems and power transmission apparatuses described below in the following items.

Item 1

A wireless power transmission system includes a power transmission apparatus and a power reception apparatus, the power transmission apparatus including a power transmission circuit that converts DC power of an external DC power supply to AC power, a first coil connected to the power transmission circuit, a second coil inductively coupled to the first coil, and two power transmission electrodes that are connected to the second coil and that transmit the AC power, the power reception apparatus including two power reception electrodes disposed opposing the two power transmission electrodes so as to be capacitively coupled with the two power transmission electrodes to contactlessly receive the transmitted AC power, a third coil connected to the two power reception electrodes, a fourth coil connected to the third coil, and a power reception circuit that is connected to the fourth coil and that converts the received AC power to DC power, the wireless power transmission system having at least one of the following combinations: a combination of i) a transmission-side series resonance circuit including the first coil and a first capacitor disposed between the first coil and the power transmission circuit, and ii) a transmission-side parallel resonance circuit including the second coil and a second capacitor disposed between the second coil and the two power transmission electrodes, and a combination of i) a reception-side parallel resonance circuit including the third coil and a third capacitor disposed between the third coil and the two power reception electrodes, and ii) a reception-side series resonance circuit including the fourth coil and a fourth capacitor disposed between the fourth coil and the power reception circuit.

In this aspect, the wireless power transmission system has at least one of the following combinations: the combination of i) the transmission-side series resonance circuit including the first coil and the first capacitor disposed between the first coil and the power transmission circuit, and ii) the transmission-side parallel resonance circuit including the second coil and a second capacitor disposed between the second coil and the two power transmission electrodes, and the combination of i) a reception-side parallel resonance circuit including the third coil and a third capacitor disposed between the third coil and the two power reception electrodes, and ii) a reception-side series resonance circuit including the fourth coil and a fourth capacitor disposed between the fourth coil and the power reception circuit.

That is, in at least one of the power transmission apparatus and the power reception apparatus, a parallel resonance circuit is disposed on a side close to an electrode, and a series resonance circuit is disposed on a side far from the electrode, and thus it is possible to preferably achieve impedance matching even in a case where the impedance between electrodes is high.

Item 2

The wireless power transmission system described in item 1 may have a combination of i) a transmission-side series resonance circuit including the first coil and the first capacitor disposed between the first coil and the power transmission circuit, and ii) a transmission-side parallel resonance circuit including the second coil and a second capacitor disposed between the second coil and the two power transmission electrodes, and a combination of i) a reception-side parallel resonance circuit including the third coil and the third capacitor disposed between the third coil and the two power reception electrodes, and ii) a reception-side series resonance circuit including the fourth coil and a fourth capacitor disposed between the fourth coil and the power reception circuit.

In this aspect, in both of the power transmission apparatus and the power reception apparatus, a parallel resonance circuit is disposed on a side close to an electrode, and a series resonance circuit is disposed on a side far from electrodes, and thus it is possible to more preferably achieve impedance matching.

Item 3

The wireless power transmission system described in item 1 may have a combination of i) a transmission-side series resonance circuit including the first coil and a first capacitor disposed between the first coil and the power transmission circuit, and ii) a transmission-side parallel resonance circuit including the second coil and a second capacitor disposed between the second coil and the two power transmission electrodes, and a combination of i) the third coil with an inductance value L3 and ii) a reception-side series resonance circuit including the fourth coil with an inductance value L4 lower than the inductance value L3 and a fourth capacitor disposed between the fourth coil and the power reception circuit.

In the aspect described above, in the power transmission apparatus, a parallel resonance circuit is disposed on a side close to an electrode, and a series resonance circuit is disposed on a side far from electrodes. Thus, it is possible to preferably achieve impedance matching.

Item 4

The wireless power transmission system described in item 1 may have a combination of i) a transmission-side series resonance circuit including the first coil with an inductance value L1 and the first capacitor disposed between the first coil and the power transmission circuit, and ii) the second coil with an inductance value L2 higher than the inductance value L1, and a combination of i) a reception-side parallel resonance circuit including the third coil and the third capacitor disposed between the third coil and the two power reception electrodes, and ii) a reception-side resonance circuit including the fourth coil and a fourth capacitor disposed between the fourth coil and the power reception circuit.

In the aspect described above, in the power reception apparatus, a parallel resonance circuit is disposed on a side close to an electrode, and a series resonance circuit is disposed on a side far from electrodes. Thus, it is possible to preferably achieve impedance matching.

Item 5

In the wireless power transmission system described in one of items 1 to 4, an air gap may be provided between the two power transmission electrodes and the two power reception electrodes disposed opposing the two power transmission electrodes.

In the aspect described above, the electrodes are spaced apart via the air gap, and it is not necessary to provide a dielectric material with high relative permittivity, which makes it possible to simplify the configuration between electrodes.

Item 6

In the wireless power transmission system described in one of items 1 to 5, when the AC power has an angular frequency ω, the second coil has an inductance value L2, and the capacitance between the two power transmission electrodes and the two power reception electrodes has a capacitance value C, a condition described in the following mathematical expression (1) may be satisfied:

$$\omega L2 < 1/(\omega C) \qquad (1).$$

In the aspect described above, the impedance between the electrodes is higher than the impedance of the second coil, and thus it is possible to achieve further enhanced effects of the impedance matching.

Item 7

In the wireless power transmission system described in one of items 1 to 5, when the AC power has an angular frequency ω, the second coil has an inductance value L2, and the capacitance between the two power transmission electrodes and the two power reception electrodes has a capacitance value C, a condition described in the following mathematical expression (3) may be satisfied:

$$10\ \omega L2 < 1/(\omega C) \qquad (3)$$

In the aspect described above, the impedance between the electrodes is extremely higher than the impedance of the second coil, and thus it is possible to achieve further extremely enhanced effects of the impedance matching.

Item 8

In the wireless power transmission system described in one of items 1 to 7, when the first coil has an inductance value L1, and the second coil has an inductance value L2, an inductance ratio N(=L2/L1) of the inductance value L2 to the inductance value L1 may satisfy a condition described in the following mathematical expression:

$$1 < N < 15.$$

In the aspect described above, it is possible to achieve the Q-value being as high as, for example, 70% or more of the peak value.

Item 9

In the wireless power transmission system described in one of items 1 to 8, when the first coil has an inductance value L1, and the second coil has an inductance value L2, an inductance ratio N(=L2/L1) of the inductance value L2 to the inductance value L1 may satisfy a condition described in the following mathematical expression:

$$3 < N < 8.$$

In the aspect described above, it is possible to achieve the Q-value being as high as, for example, 90% or more of the peak value.

Item 10

In the wireless power transmission system described in one of items 1 to 9, when the third coil has an inductance value L3, and the fourth coil has an inductance value L4, an inductance ratio N(=L3/L4) of the inductance value L3 to the inductance value L4 may satisfy a condition described in the following mathematical expression:

$$1<N<15.$$

In the aspect described above, it is possible to achieve the Q-value being as high as, for example, 70% or more of the peak value.

Item 11

In the wireless power transmission system described in one of items 1 to 9, when the third coil has an inductance value L3, and the fourth coil has an inductance value L4, an inductance ratio N(=L3/L4) of the inductance value L3 to the inductance value L4 may satisfy a condition described in the following mathematical expression:

$$3<N<8.$$

In the aspect described above, it is possible to achieve the Q-value being as high as, for example, 90% or more of the peak value.

Item 12

A power transmission apparatus in a wireless power transmission system includes the power transmission apparatus and a power reception apparatus, the power transmission apparatus including a power transmission circuit that converts DC power of an external DC power supply to AC power, a first coil connected to the power transmission circuit, a second coil inductively coupled to the first coil, two power transmission electrodes that are connected to the second coil and that transmit the AC power, the power reception apparatus including two power reception electrodes disposed opposing the two power transmission electrodes so as to be capacitively coupled with the two power transmission electrodes to contactlessly receive the transmitted AC power, a third coil connected to the two power reception electrodes, a fourth coil connected to the third coil, and a power reception circuit that is connected to the fourth coil and that converts the received AC power to DC power, the power transmission apparatus having a combination of a transmission-side series resonance circuit including the first coil and a first capacitor disposed between the first coil and the power transmission circuit, and a transmission-side parallel resonance circuit including the second coil and a second capacitor disposed between the second coil and the two power transmission electrodes.

In the aspect described above, the power transmission apparatus has the combination of the transmission-side series resonance circuit including the first coil and the first capacitor disposed between the first coil and the power transmission circuit, and the transmission-side parallel resonance circuit including the second coil and the second capacitor disposed between the second coil and the two power transmission electrodes. In this configuration, in the power transmission apparatus, a parallel resonance circuit is disposed on a side close to an electrode, and a series resonance circuit is disposed on a side far from the electrode. This makes it possible to advantageously achieve impedance matching even in a case where the impedance between electrodes is high.

Item 13

In the power transmission apparatus described in item 12, wherein an air gap may be provided between the two power transmission electrodes and the two power reception electrodes disposed opposing the two power transmission electrodes.

In the aspect described above, the electrodes are spaced apart via the air gap, and it is not necessary to provide a dielectric material with high relative permittivity, which makes it possible to simplify the configuration between electrodes.

Item 14

In the power transmission apparatus described in item 12 or 13, when the AC power has an angular frequency ω, the second coil has an inductance value L2, and the capacitance between the electrodes has a capacitance value C, a condition described in the following mathematical expression (4) may be satisfied:

$$\omega L2 < 1/(\omega C) \qquad (4).$$

In the aspect described above, the impedance between the electrodes is higher than the impedance of the second coil, and thus it is possible to achieve further enhanced effects of the impedance matching.

Item 15

In the power transmission apparatus described in item 12 or 13, when the AC power has an angular frequency ω, the second coil has an inductance value L2, and the capacitance between the two power transmission electrodes and the two power reception electrodes has a capacitance value C, a condition described in the following mathematical expression (5) may be satisfied:

$$10\omega L2 < 1/(\omega C) \qquad (5).$$

In the aspect described above, the impedance between the electrodes is extremely higher than the impedance of the second coil, and thus it is possible to achieve further extremely enhanced effects of the impedance matching.

Item 16

In the wireless power transmission system described in one of items 12 to 15, when the first coil has an inductance value L1, and the second coil has an inductance value L2, an inductance ratio N(=L2/L1) of the inductance value L2 to the inductance value L1 may satisfy a condition described in the following mathematical expression:

$$1<N<15.$$

In the aspect described above, it is possible to achieve the Q-value being as high as, for example, 70% or more of the peak value.

Item 17

In the wireless power transmission system described in one of items 12 to 15, when the first coil has an inductance value L1, and the second coil has an inductance value L2, an inductance ratio N(=L2/L1) of the inductance value L2 to the inductance value L1 may satisfy a condition described in the following mathematical expression:

$$3<N<8.$$

In the aspect described above, it is possible to achieve the Q-value being as high as, for example, 90% or more of the peak value.

The technique of the present disclosure may be used in an apparatus such as a surveillance camera, a robot, or the like in which, in addition to electric power transmission, real-time bidirectional transmission of data is necessary. According to embodiments of the present disclosure, it is possible to perform full-duplex bidirectional data transmission between a power transmission apparatus and a power reception apparatus.

What is claimed is:

1. A wireless power transmission system comprising a power transmission apparatus and a power reception apparatus, the power transmission apparatus comprising:
a power transmission circuit that converts DC power of an external DC power supply to AC power;
a first coil connected to the power transmission circuit;
a second coil inductively coupled to the first coil; and
two power transmission electrodes that are connected to the second coil and that transmit the AC power, the power reception apparatus comprising:
two power reception electrodes disposed opposing the two power transmission electrodes so as to be capacitively coupled with the two power transmission electrodes to wirelessly receive the transmitted AC power;
a third coil connected to the two power reception electrodes;
a fourth coil connected to the third coil; and
a power reception circuit that is connected to the fourth coil and that converts the received AC power to DC power;

the wireless power transmission system having both of the following combinations:

a combination of:
i) a transmission-side series resonance circuit including the first coil and a first capacitor disposed between the first coil and the power transmission circuit, and
ii) a transmission-side parallel resonance circuit including the second coil and a second capacitor disposed between the second coil and the two power transmission electrodes, and a combination of:
i) a reception-side parallel resonance circuit including the third coil and a third capacitor disposed between the third coil and the two power reception electrodes, and
ii) a reception-side series resonance circuit including the fourth coil and a fourth capacitor disposed between the fourth coil and the power reception circuit.

2. The wireless power transmission system according to claim 1, wherein the wireless power transmission system has a combination of:
i) a transmission-side series resonance circuit including the first coil and a first capacitor disposed between the first coil and the power transmission circuit, and
ii) a transmission-side parallel resonance circuit including the second coil and a second capacitor disposed between the second coil and the two power transmission electrodes, and a combination of:
i) the third coil with an inductance value L3 and
ii) a reception-side series resonance circuit including the fourth coil with an inductance value L4 lower than the inductance value L3 and a fourth capacitor disposed between the fourth coil and the power reception circuit.

3. The wireless power transmission system according to claim 1, wherein the wireless power transmission system has a combination of:
i) a transmission-side series resonance circuit including the first coil with an inductance value L1 and the first capacitor disposed between the first coil and the power transmission circuit, and
ii) the second coil with an inductance value L2 higher than the inductance value L1, and a combination of:
i) a reception-side parallel resonance circuit including the third coil and the third capacitor disposed between the third coil and the two power reception electrodes, and
ii) a reception-side series resonance circuit including the fourth coil and a fourth capacitor disposed between the fourth coil and the power reception circuit.

4. The wireless power transmission system according to claim 1, wherein an air gap is provided between the two power transmission electrodes and the two power reception electrodes disposed opposing the two power transmission electrodes.

5. The wireless power transmission system according to claim 1, wherein when the AC power has an angular frequency $\omega$, the second coil has an inductance value L2, and the capacitance between the two power transmission electrodes and the two power reception electrodes has a capacitance value C, a condition described in the following mathematical expression (1) is satisfied:

$$\omega L2 < 1/(\omega C) \qquad (1).$$

6. The wireless power transmission system according to claim 1, wherein when the AC power has an angular frequency $\omega$, the second coil has an inductance value L2, and the capacitance between the two power transmission electrodes and the two power reception electrodes has a capacitance value C, a condition described in the following mathematical expression (3) is satisfied:

$$10\omega L2 < 1/(\omega C) \qquad (3).$$

7. The wireless power transmission system according to claim 1, wherein when the first coil has an inductance value L1, and the second coil has an inductance value L2, an inductance ratio $N(=L2/L1)$ of the inductance value L2 to the inductance value L1 satisfies a condition described in the following mathematical expression:

$$1 < N < 15.$$

8. The wireless power transmission system according to claim 1, wherein when the first coil has an inductance value L1, and the second coil has an inductance value L2, an inductance ratio $N(=L2/L1)$ of the inductance value L2 to the inductance value L1 satisfies a condition described in the following mathematical expression:

$$3 < N < 8.$$

9. The wireless power transmission system according to claim 1, wherein when the third coil has an inductance value L3, and the fourth coil has an inductance value L4, an inductance ratio $N(=L3/L4)$ of the inductance value L3 to the inductance value L4 satisfies a condition described in the following mathematical expression:

$$1 < N < 15.$$

10. The wireless power transmission system according to claim 1, wherein when the third coil has an inductance value L3, and the fourth coil has an inductance value L4, an inductance ratio $N(=L3/L4)$ of the inductance value L3 to the inductance value L4 satisfies a condition described in the following mathematical expression:

$$3 < N < 8.$$

11. A power transmission apparatus used in the wireless power transmission system according to claim 1.

12. A reception apparatus used in the wireless power transmission system according to claim 1.

* * * * *